(12) United States Patent
Liebl et al.

(10) Patent No.: US 7,231,584 B2
(45) Date of Patent: Jun. 12, 2007

(54) METHOD FOR ERROR CORRECTION IN PACKET-ORIENTED DATA TRANSMISSION WITH TRANSMISSION BLOCKS THAT ARE BETTER DETERMINED BY DESCRIPTORS

(75) Inventors: Günther Liebl, Freising (DE); Jürgen Pandel, Feldkirchen-Westerham (DE); Marcel Wagner, München (DE); Wenrong Weng, München (DE)

(73) Assignee: Siemens Aktiengesellschaft, Munich (DE)

( * ) Notice: Subject to any disclaimer, the term of this patent is extended or adjusted under 35 U.S.C. 154(b) by 204 days.

(21) Appl. No.: 10/496,343

(22) PCT Filed: Nov. 18, 2002

(86) PCT No.: PCT/DE02/04242

§ 371 (c)(1),
(2), (4) Date: Sep. 2, 2004

(87) PCT Pub. No.: WO03/047147

PCT Pub. Date: Jun. 5, 2003

(65) Prior Publication Data

US 2005/0005222 A1 Jan. 6, 2005

(30) Foreign Application Priority Data

Nov. 21, 2001 (DE) .................................. 101 57 053

(51) Int. Cl.
*H03M 13/00* (2006.01)
(52) U.S. Cl. ...................................................... 714/776
(58) Field of Classification Search ................ 714/752, 714/776
See application file for complete search history.

(56) References Cited

U.S. PATENT DOCUMENTS

| 6,249,895 | B1 | | 6/2001 | Kikuchi et al. ............. 714/775 |
| 6,405,338 | B1 | * | 6/2002 | Sinha et al. ................ 714/752 |
| 6,694,474 | B2 | * | 2/2004 | Ramprashad et al. ....... 714/755 |
| 2004/0039984 | A1 | | 2/2004 | Burkert et al. .............. 714/748 |

FOREIGN PATENT DOCUMENTS

WO    WO 02/11350 A1    2/2002

OTHER PUBLICATIONS

Sinha et al., Unequal error protection methods for perceptual audio coders, 1999, IEEE, p. 2423-2426.*

* cited by examiner

*Primary Examiner*—Shelly Chase
(74) *Attorney, Agent, or Firm*—Staas & Halsey LLP

(57) ABSTRACT

Additional descriptors are used which, unlike known descriptors, only describe the size of the subset and the difference in correction capability. The additional descriptors also identify a defined separation between a signaling block and at least one data block, in addition to the positions of the filler bits within the transmission block or data block.

7 Claims, No Drawings

METHOD FOR ERROR CORRECTION IN PACKET-ORIENTED DATA TRANSMISSION WITH TRANSMISSION BLOCKS THAT ARE BETTER DETERMINED BY DESCRIPTORS

CROSS REFERENCE TO RELATED APPLICATIONS

This application is based on and hereby claims priority to PCT Application No. PCT/DE02/04242 filed on Nov. 18, 2002 and German Application No. 101 57 053.8 filed on Nov. 21, 2001, the contents of which are hereby incorporated by reference.

BACKGROUND OF THE INVENTION

The invention relates to a method for error correction in which descriptors contained in a transmission block combine code words for this transmission block having the same correction capability in subsets and describe the size of the subset and also the difference in the correction capability of the subset.

With regard to the packet-oriented transmission of data, in general bit errors occur in the case of fixed networks on account of an overload situation at network nodes and in the case of mobile channels as a result of atmospheric disturbances and multiple path propagations, the bit errors which are detected by error-detecting codes and result in entire packets being discarded. So-called Reliable Transport Protocols such as TCP use repeat mechanisms (Automatic Repeat Request method) in order to be able to reliably transport lost or discarded packets to the receiver in spite of faulty channels. However, this has associated with it a very considerable increase in transmission delay which nonetheless cannot be tolerated, particularly in the case of communication applications. Unreliable Transport Protocols, such as UDP for example, are therefore used here. While it is true that these cause no increase in the transmission delay, neither do they offer any form of mechanisms for compensating for packet losses. Intensive efforts have therefore been made for some time in the Audio Visual Transport Group (AVT) of the IETF to link methods for forward error correction (FEC) and packet-oriented transmission with Unreliable Transport Protocols. In this situation, a plurality of data packets are for example coded in one step and the z code words $cw_i$, where $0<i<z$, having the length N are arranged in such a way in a storage field that the code words form the rows or columns of a zxN or Nxz matrix. Columns or rows are then mapped to packets of a transport layer, for example RTP/UDP, and transmitted. In order to obtain a source-adaptive coding the code words $cw_i$ of a matrix can exhibit a different form of protection against errors or erasures.

If the correction capability of a code word $cw_i$ is designated as $ep_i$ in the following, then a so-called error protection profile EPP describes the correction capability of the set of code words which are combined in a matrix EPP=$\{ep_0, ep_1, \ldots ep_{z-1}\}$. The error protection profiles of two successive matrixes or transmission blocks can be different, whether it be in order to adapt the error protection to the source or also to the channel. However, in order to be able to decode the code words of a transmission block at the receiver, the corresponding error protection profile EPP must be known or transmitted to the decoder. This requires reliable signaling. The signaling should be efficient in order to keep the additional overhead as small as possible. It would be very inefficient to transmit a sufficiently large number of fields in the header of each transmission packet for this purpose, and a transmission outside of the logical channel (out-of-band signaling) means an additional resource requirement. It is therefore better to use descriptors which combine code words of a transmission block having the same correction capability in a subset and describe the size of the subset as well as the difference in the correction capability of the previously initiated subset (differential description).

SUMMARY OF THE INVENTION

One possible object of the invention therefore relates to a method for error correction in a packet-oriented transmission, which in the decoder enables enhanced reconstructability of the data from the transmission blocks and also enhanced utilization of the transmission blocks.

The inventors propose a method that uses additional descriptors which do not only, as do the known descriptors, describe the size of the subset and the difference in correction capability, but also identify a defined separation between a signaling block and at least one data block, in addition to the positions of the filler bits within a transmission block or data block.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The error protection profile EPP of the transmission block is EPP=$\{7,7,7,7,4,4,4,4,4,4,4,4,4,4,3,3,3,3,6,6,6,6,6,6,0,0,0,0,0,0,0\}$ in this case. A data block B1 requires the upper 18 rows, whereby in the 18th row the S1=3 last data bytes are to be ignored and a further data block B2 requires the remaining rows, whereby in the last row S2=10 bytes are to be ignored.

In this example, a transmission block B contains N=28 data packets each containing z=32 symbols or bytes b, whereby the transmission block B is always divided into a signaling block SB and subsequent data blocks, for example the data blocks B1 and B2. These data blocks can for example be P frames, B frames or I frames of MPEG-coded video image sequences. In this example, the signaling block contains only z1=1 rows, the data block B1 contains m1=18 rows and the data block B2 contains m2=13 rows.

With regard to the method, descriptors are initially determined in an already known manner from the error protection profile. These known descriptors each have one byte. The information items n and ep are each encoded using 4 bits, whereby n is of unsigned type and ep is of signed type. As follows from the EPP, the first subset of code words has 4 code words which have a correction capability of 7, which is thus 7 smaller than, for example, a predefined $ep_0=ep_{max}=14$. The first descriptor is thus DP=0x4F, since in this case N represents the leftmost half-byte and the difference of the correction capabilities ep represents the rightmost half-byte, whereby the second half-byte F signifies signed hexadecimal −7, in other words ep=14−7=7. The next subset has ten code words having the correction capability 4, where the second descriptor is DP=0xAB since A signifies unsigned hexadecimal N=10 and B signifies signed hexadecimal −3, in other words ep=7−3=4. The third descriptor is DP=0x49 and the last two descriptors are DP=0x63 and DP=0x7E. The totality of these descriptors is thus (0x4F, 0xAB, 0x49, 0x63, 0x7E).

After the 18th row, in other words after the descriptor 0x49, the description for a first separating element is inserted. The separating element is an end of data block descriptor in the form of a null byte (0x00) and a filler bit descriptor in the form of a following byte (0x03) containing the stuffing indicator S1=3. Then follow the descriptors for the second data block B2, and finally the separating element (0x00,0x0A) is signaled with null byte and stuffing indicator=10 or A. The descriptors, including the first which still remains to be created, all fit into one row, so a signaling block with z1=1 rows is sufficient and a signaling descriptor D1=(0x10) is used at the beginning of the descriptors. The totality of these descriptors here is thus D1 . . . D1O=(0x10, 0x4F, 0xAB, 0x49, 0x0, 0x3, 0x63, 0x7E, 0x0, 0xA).

Since the number of code words z, in other words the size of the payload of each packet, is known to the decoder, it is always possible to determine whether further descriptors may follow or whether the decoding of the descriptors can be ended. There is therefore no longer only one matrix which contains everything but a z1xN matrix which contains the signaling and a z2xN matrix which contains the data to be protected. This matrix is combined to form a (z1+z2)xN matrix, whereby the upper part of the matrix contains the signaling matrix, where z=z1+z2. In order to eliminate the still remaining dependency between data matrix and signaling matrix, the size z1 must be signaled explicitly. This is achieved for example by sending the descriptor D1=(0,z1) in advance of the other descriptors. In the series of the known descriptors, the otherwise unused descriptor (0,0) and a so-called stuffing indicator (S) for signaling the number of filler bits are then inserted after signaling of one part of the error protection profile EPP. The descriptor (0,0) signals the end of a transmission block in the data part of the matrix, in other words the EPP specified by the descriptors preceding (0,0) describes an independent sub-matrix m1xN in the data matrix z2xN. The stuffing indicator which follows it describes the number S1 of symbols or bytes to be ignored in the last row of the m1xN matrix. Subsequently the following known descriptors are taken into consideration, and an m2xN sub-matrix whose last S2 symbols can be ignored is again defined by the insertion of (0,0) and S2. The sequence of descriptors always ends with (0,0) and (Si), whereby the last sub-matrix mixN is defined as a result. m1+m2+ . . . +mi=z2 holds true.

The following problems, for example, are avoided through use of the method described above:

1. When the signaling for the EPP is written into a matrix together with the data to be protected, problems arise as a result of the dependencies between the data to be protected and the signaling. Frequently the scope of the data to be protected is smaller than the area which is available for this data. One possible way of making optimum use of the area relates to the fact that the redundancy profile is converted and is used for additional protection. In this case the signaling for the EPP will change and, if applicable, expand by a descriptor. For this purpose, however, two additional symbols are required in the matrix, which is not possible if there is only space available for one symbol. The unused area can thus not be utilized. However, that is not only a waste of resources but also leads to further problems.

2. The situation can occur whereby the EPP is predefined, for example when there is a requirement as in the case of the so-called "equal erasure protection" for the correction capabilities of all code words to be the same in each row. Since the data to be protected likewise has a predefined size, it is generally not possible to achieve the situation whereby all fields in the matrix are used. In practice, however, this results in the fact that the precise data stream which has been written into the matrix cannot be reconstructed again by the recipient, even if no pack are lost during the transmission, because the recipient is missing the precise information as to which part of the matrix has been used for the data and which part has not been used at all.

3. Finally, the situation can also occur whereby a plurality of independent elements are filled into the matrix as data to be protected. At times, these can only be reconstructed if the start of each element is know. This is the situation for example in the case of two video frames: Each frame can be preceded by an RTP payload header which under certain circumstances can no longer be found for the second frame when the two data streams are linked together and regarded as one data stream.

The invention has been described in detail with particular reference to preferred embodiments thereof and examples, but it will be understood that variations and modifications can be effected within the spirit and scope of the invention.

The invention claimed is:

1. A method for error correction in packet-oriented data transmission, comprising:
   defining transmission blocks by descriptors;
   creating a set of code words for each transmission block, the set of code words relating to correction capabilities and an error protection profile for the respective transmission block;
   forming descriptors for each transmission block to directly or indirectly describe immediately sequenced code words within a subset having the same correction capability, the descriptors directly or indirectly describing the size and correction capability of subsets; and
   dividing the transmission block into sub-data blocks each having the same error correction capability such that the end of each sub-data block is marked by a respective end of a data block descriptor which has a reserved descriptor value.

2. The method according to claim 1, further comprising inserting a filler bit descriptor for each sub-block, which filler bit descriptor specifies the number of filler bits at the end of the respective data block the filler bit descriptor being inserted after the end of the data block descriptor.

3. The method according to claim 2, wherein
   the transmission block is divided into a signaling block containing the descriptors and into separate sub-data blocks, and
   a signaling descriptor, which specifies the number of rows required for the signaling block, is inserted at a first position in the signaling block.

4. A method according to claim 3,
   whereby all descriptors have the same format.

5. The method according to claim 1, wherein
   the transmission block is divided into a signaling block containing the descriptors and into separate sub-data blocks, and
   a signaling descriptor, which specifies the number of rows required for the signaling block, is inserted at a first position in the signaling block.

6. A method according to claim 1,
   whereby all descriptors have the same format.

7. A method for error correction in packet-oriented data transmission, comprising:
   dividing a transmission block into sub-data blocks each having the same error correction capability, each sub-data block containing at least one code word; and
   using descriptors to describe the length of each sub-data block and to describe how the error correction capability of each sub-data block differs from a neighboring sub-data block, the descriptors not providing a full description of the error correction capability of individual code words.

* * * * *